United States Patent [19]
Evans et al.

[11] Patent Number: 5,900,685
[45] Date of Patent: *May 4, 1999

[54] ANTI-NOISE SYSTEM FOR A MOVING OBJECT

[75] Inventors: Nigel Evans, Sutton Coldfield; William E. Hewlett, Walmley, both of United Kingdom

[73] Assignee: Light & Sound Design, Ltd., Birmingham, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/596,015

[22] Filed: Feb. 6, 1996

[51] Int. Cl.⁶ .................................................. F16D 3/28
[52] U.S. Cl. ................................... 310/51; 464/106
[58] Field of Search ........................ 310/51; 464/51, 464/54, 102–106, 180

[56] References Cited

U.S. PATENT DOCUMENTS

| | | | |
|---|---|---|---|
| Re. 31,820 | 1/1985 | Litch | 219/93 |
| 677,872 | 7/1901 | Locke | 464/64 |
| 1,169,133 | 1/1916 | De Kleist et al. | 310/51 |
| 1,579,967 | 4/1926 | Sweney | 464/60 |
| 2,209,477 | 7/1940 | Reibel | 310/51 |
| 2,449,555 | 9/1948 | Hopkins et al. | 464/60 |
| 2,559,329 | 6/1951 | Huntington | 64/31 |
| 2,811,867 | 11/1957 | Hogberg | 74/504 |
| 3,134,246 | 5/1964 | Mesh | 64/30 |
| 3,395,553 | 8/1968 | Stout | 64/15 |
| 3,941,339 | 3/1976 | McCarty | 248/15 |
| 3,943,778 | 3/1976 | Wyse | 74/5 F |
| 4,114,403 | 9/1978 | Grey | 64/15 B |
| 4,227,785 | 10/1980 | Herbert | 353/50 |
| 4,339,938 | 7/1982 | Nakagawa et al. | 72/178 |
| 4,340,955 | 7/1982 | Elliot | 369/213 |
| 4,425,813 | 1/1984 | Wadensten | 74/87 |
| 4,462,583 | 7/1984 | Smith et al. | 270/31 |
| 4,527,683 | 7/1985 | Mathews | 192/111 A |
| 4,596,154 | 6/1986 | Greubel | 73/862.08 |
| 4,602,176 | 7/1986 | Baker | 310/51 |
| 4,721,169 | 1/1988 | Nagasawa et al. | 173/12 |
| 4,772,245 | 9/1988 | Readman et al. | 464/89 |
| 4,952,194 | 8/1990 | Eckel et al. | 464/60 |
| 5,085,289 | 2/1992 | Chance | 180/383 |
| 5,152,631 | 10/1992 | Bauer | 403/372 |
| 5,267,903 | 12/1993 | Kuribayashi | 464/104 |
| 5,270,630 | 12/1993 | Castelli et al. | 318/602 |
| 5,303,681 | 4/1994 | Crofts | 123/192.1 |
| 5,415,587 | 5/1995 | Fenley | 464/71 |

*Primary Examiner*—Thomas M. Dougherty
*Attorney, Agent, or Firm*—Fish & Richardson P.C.

[57] ABSTRACT

A noise-reduced stage lighting system has a motor having an output shaft driving a moving part of a stage lighting device, e.g. pan and tilt functions. An anti noise coupling is used to attenuate the noise produced by the assembly. An interface surface is formed with no metal connections between the noisy motor and the relatively quieter downstream components.

10 Claims, 2 Drawing Sheets

ANTI-NOISE SYSTEM FOR A MOVING OBJECT

This invention relates to anti-noise connections in a motor-driven assembly, and more particularly to a combination of anti-noise elements which quiet the operation of such an assembly.

BACKGROUND AND SUMMARY OF THE INVENTION

The entertainment industry requires that lights and light modifying elements such as color changers be moved. Motors and other moving elements, however, are inherent sources of noise. The inventors of the present invention realized that silent operation is highly desirable so that an audience watching a theater production will not be disturbed.

However, there is a trade-off between the speed of movement of various elements and the amount of noise that they produce. Belts and pulleys can be just as noisy as gears, depending on the speed and quality. Belts and pulleys are very noisy when running fast. The first stage of a reduction train runs at speeds which are typically above 1500 rpm. This high speed operation invariably produces noise. At speeds below 1500 rpm, belt and pulley systems become much quieter. This is especially true when noise-reducing mechanisms, such as special tooth-cutting methods, are used. The belt and pulley uses a rubber belt to transmit the force from the driving pulley to the driven pulley. The belt and pulley inherently has low noise transmission and noise vibration. The damping effect of the belt in essence minimizes the transmission of noise and vibration.

Gears, on the other hand, transmit noise directly from the driving gear to the driven gear due to direct contact between the teeth.

The inventor recognized that belts do a very good job of preventing noise transmission so long as they are going slow. The inventor realized, therefore, that a belt in the final stage of the reduction train would help quiet the system. The high speed portion will inherently have noise therein. Since both gears and pulleys will cause noise, the inventors recognized that the quietest solution for the high speed portion is to use small plastic gears with small teeth. This portion will inherently have noise therein.

It is an object of the present invention to isolate this noise and prevent it from travelling through the rest of the system. The inventors recognized that this could be accomplished by allowing any necessary noise to occur at one spot in the unit. That one spot, and hence the noise, is isolated from other places in the unit. Every location which is isolated from the initial noise is formed of low-noise components, such as low-speed belts. Accordingly, the structure of the present invention includes a first movement element which is noisy, a second movement element which is quiet, and a noise isolating structure between said first and second movement elements.

The inventors of the present invention noticed that such noise, although often masked by the sounds of the theater production, can prove very bothersome to the user. In order to obviate this problem, the inventors determined that a certain combination of elements minimizes the noise from such systems.

According to the present invention, a connection between an output shaft of a motor and a pulley is formed using an anti-noise element combination. The pulley is then connected via a belt to a driven shaft. One element of the anti-noise element combination includes a flexible coupling system which has inner surfaces which are substantially the same shape as the outer surface of the driving shafts. Typically these driving shafts are cylindrical. The flexible coupling has elements allowing tightening of these surfaces around the driving shaft. When a specific end of the coupling is tightened, it contracts in size around the shaft, thus tightly gripping the shaft.

Many different kinds of couplings are used. The most preferably used one includes a plurality of circumferential cuts through the middle portion. These cuts, and the material of the coupling, contribute to the ability of the flex coupling to flex in directions which are perpendicular to the axial direction. This has the advantage of minimizing the amount of direct physical noise across the coupling.

Another aspect of the invention relates to the way in which the drive system, the motor, and shaft are mounted to the mounting plate. According to the present invention, rubber grommets are used to minimize driving motor and the plates supporting the pulley system.

BRIEF DESCRIPTION OF THE DRAWINGS

These and other aspects of the invention will now be described in detail with reference to the accompanying drawings, wherein.

DESCRIPTION OF THE PREFERRED EMBODIMENT

Figure 1:
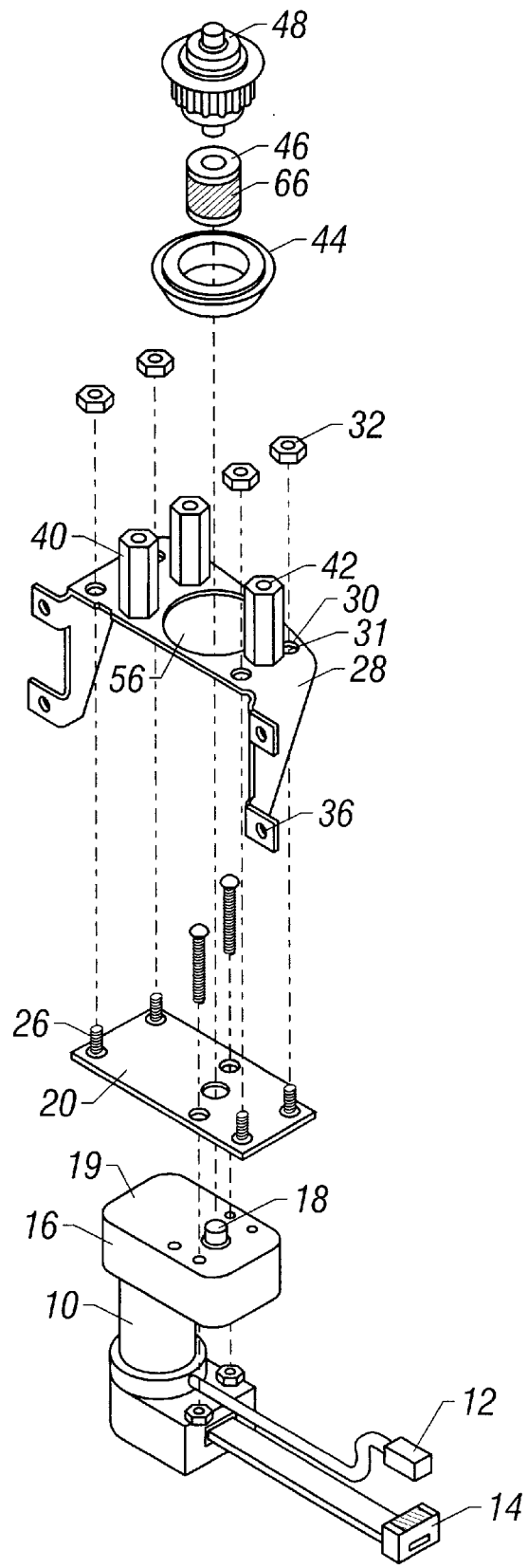
FIG. 1 is an exploded perspective view of a motor using the anti-noise elements of the present invention.

FIG. 1 illustrates a preferred embodiment of a motor assembly for use with the anti-noise elements of this invention. FIG. 1 shows DC motor 10 having a power input 12 and a serial control input 14. Control input 14 is designed to attach to a mating plug from a control panel, computer, or similar controlling unit. The motor is controlled by applying power through line 12, and the resulting motion is monitored via encoder output 14.

The rotational output of motor 10 has a high speed output, since this is the initial stage of the motor. As described above, the gears are preferably high quality plastic small gears which use well-known techniques to minimize the amount of noise they produce. Since, however, these gears run at high speed, they must inherently produce noise.

Gear box 16 reduces the speed of rotation as desired so that output shaft 18 produces the speed-reduced rotation.

Mounting plate 20 is attached directly to a surface 19 of the gear box 16.

The motor assembly is to be attached to another object, here frame 28. The motor assembly, however, is noisy, and the pulley in the frame 28 is not noisy.

Figure 2:
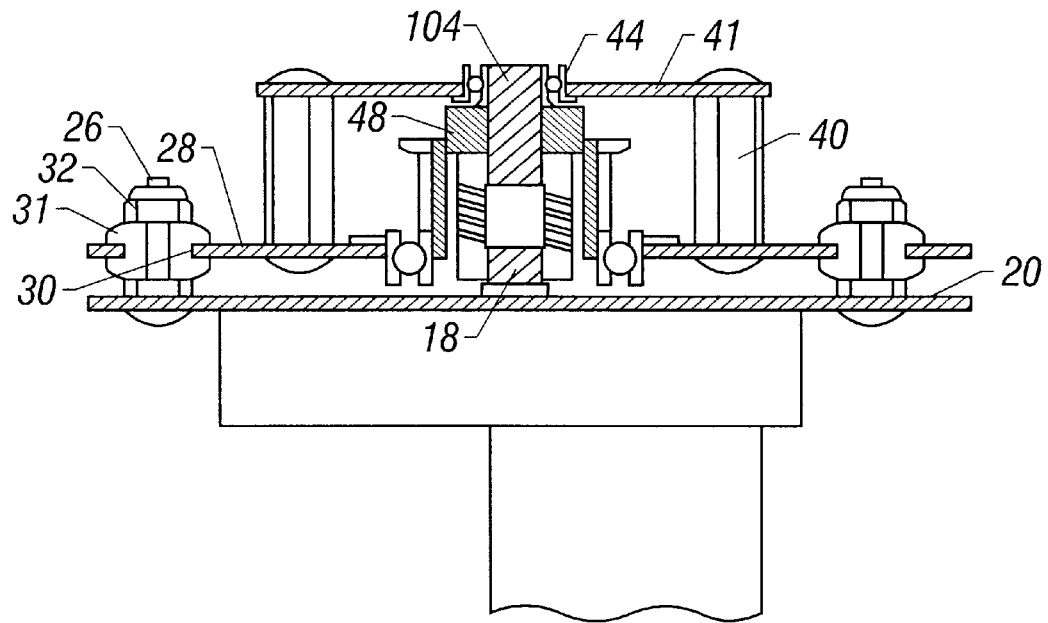
FIG. 2 is a cross-sectional view of an assembled anti-noise assembly according to a first embodiment of this invention.

Rubber grommets 31 are provided in holes 30 in attachment bracket 28 to prevent any metal to metal transmission between the attachment plate 20 and the bracket 28. FIG. 2 shows the arrangement of these grommets in detail. The grommet 31 fills a hole 30. Screw 26 goes through the hole within the grommet 31. The screw 26 is held in place by nut 32. This hence holds the motor assembly to the frame 28, and effectively prevents metal-to-metal contact between the plates 20 and 28.

Attachment bracket 28 preferably includes extending legs 34 including holes allowing attachment to another object. tabs 36. Each tab 36 includes a mounting aperture 38 formed therein. Only the low noise side of the motor assembly is connected to the support 28. The high speed motor is left "hanging"; held by the screws and grommets. The high speed motor can hence be wiggled and moved relative to the frame on which it is mounted. This further facilitates isolating the noise produced by this high speed motor.

Stand-offs 40 are attached to a top surface of attachment bracket 28. Each stand-off top surface includes threaded aperture 42 to receive a bolt which holds the pulley 48 in place.

Lower bearing 44, flexible coupling 46 and pulley 48 all cooperate to transmit power from output shaft 18 to a belt and thereby to a shaft to be driven by the assembly. This shaft can be used to drive a color changer, pan and/or tilt functions in a moving light, or any in other device where minimization of noise is important.

Lower bearing 44 is held within a receiving opening 56 in attachment bracket 28. Lower bearing 44 includes inner surfaces defining an area within which pulley 48 is rotated. These inner surfaces are appropriately shaped to facilitate rotational movement of the pulley 48.

Pulley 48 typically includes a belt wound therearound to provide power to a driven element. Since this pulley is downstream of the speed reduction carried out by the gear mechanism in gear box 16, however, the pulley operation can be relatively quiet.

According to the present invention, a noise-isolating element 46 couples between the shaft 18 from the gear box and the shaft 104 from the pulley. This noise-isolating element, according to the present invention, needs to be an element which provides some measure of sound isolation between the two elements. The preferred mode uses the flexible coupling described above. This is an element often used for coupling mismatched shafts. Other similar elements, however, can alternately be used. This includes other kinds of flexible coupling elements, or any means which connects rotating elements while attenuating the sound therefrom. For example, this could be embodied by a bellows, a coiled spring or other elements. The flexible coupling elements described herein are advantageous in their constant velocity and high strength.

One example of a suitable flexible coupling is described in U.S. Pat. No. 3,068,668, the contents of which are hereby incorporated by reference.

The flexible coupling includes a plurality of circumferential cuts which allow the flexing of the coupling. These circumferential cuts 66 allow the top portion of flexible coupling 46 to flex relative to bottom portion so that the solid top portion and the solid bottom portion need not be parallel to each other. This operation compensates any mismatches due to irregularities or eccentricities of output shaft 18 and drive shaft 104.

Circumferential cuts 66 may be either helically formed in the flexible coupling 46 or may be individual circumferential rings. There must be some locations where the cuts do not extend through the entire diameter, to prevent one portion of the coupling from separating from the other. In either case, circumferential cuts 66 may be formed when the flexible coupling 46 is initially injection molded, or may be formed afterwards by appropriate and well-known machining methods.

Flexible coupling 46 may be formed of metal, or of a flexible material such as rubber or other appropriate resilient, bendable material. Alternatively, flexible coupling may be formed of spring steel or other metal molded within rubber. Flexible coupling 46 is preferably integrally molded with top and bottom solid portions 62 and 64, but these solid portions may be individually manufactured and later attached to the intermediate flexible portion containing the circumferential cuts 66. Flexible coupling 46 is preferably pressure molded, but may be formed according to other appropriate manufacturing techniques, well known in the art.

Figure 3:
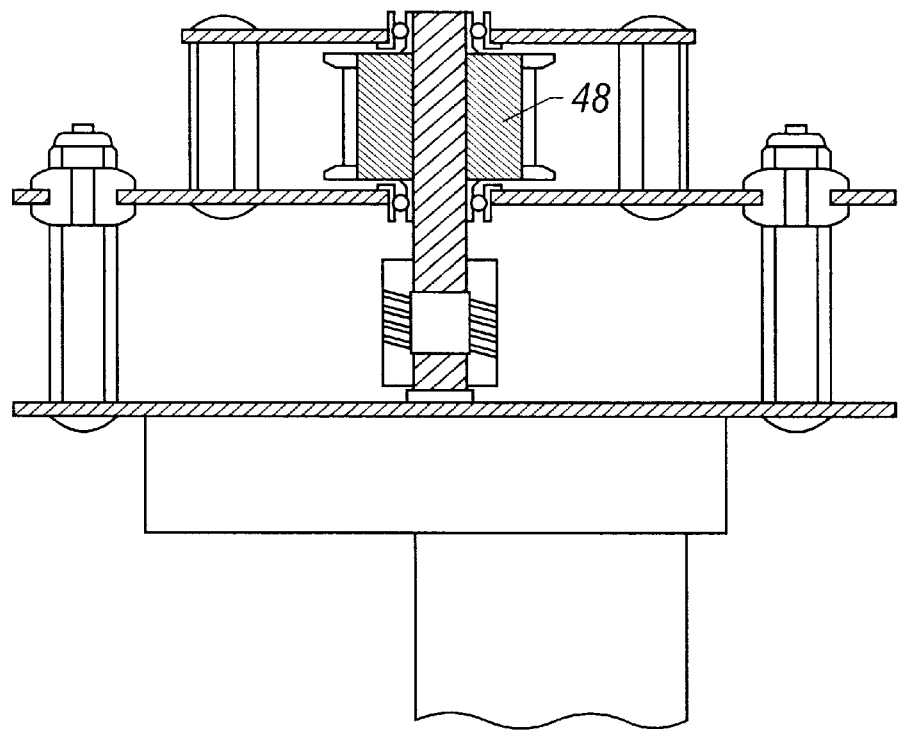
FIG. 3 is a cross-sectional view of an assembled anti-noise assembly according to a second embodiment of this invention.

FIGS. 2 and 3 show more clearly the construction of this invention when assembled. FIG. 2 shows a first embodiment in which the shaft and flexible coupling are held within the hollow pulley 48. The second embodiment of FIG. 3 has a solid pulley 48, and the coupling is hence outside the boundaries of the shaft.

Output shaft 18 is connected to the bottom surface of flexible coupling 46 which also holds output shaft 104. Output shaft 104 holds pulley 48 which is supported in bearing 44. In this manner, rotation of the output shaft of the high speed motor 10 is transmitted via flexible coupling to shaft 50 and thus to pulley 48. A belt disposed around pulley 48 thereby transmits power from the motor to a shaft to be driven.

Pulley 48 is held in place by a retaining assembly comprising standoffs 40 and top plate 41.

In operation, the motor 10 is powered by power source 12 and monitored via encoder output 14. Upon input of power through input 12, the motor rotates, thereby rotating the output shaft 18 according to the appropriate ratio of gear box 16.

Rotational motion of the output shaft 18 causes rotation of the flexible coupling 46 which transfers the rotational motion to the shaft 104 and thereby to pulley 48.

While this flexible coupling 46 has been described as joining a motor shaft with a pulley shaft, it should be clear that this flexible coupling system may also be used to couple a shaft and a pulley shaft at a distance remote from a motor.

Although this invention has been fully described by way of example with reference to the accompanying drawings, it is to be understood that various changes and modifications will be apparent to those skilled in the art.

For example, the flexible coupling could be replaced as described above. The invention is not limited to the gears and belt drives that are mentioned herein; instead any kind of drive system could be used. The actual mounting techniques could also be replaced by any other standard technique. Other modifications are contemplated.

What is claimed is:

1. A noise reducing drive system which drives a driven element of a stage lighting assembly, comprising:

a stage lighting device, having a driven element to be moved and which when moved, changes a lighting effect produced by said stage lighting device, said stage lighting device including an input shaft;

a motor assembly having an output shaft, said motor assembly producing noise during operation;

a flexible, vibration damping coupling element, having surfaces which are attached to said output shaft and surfaces which are attached to said input shaft, said coupling element being flexible in a way that allows compensating for mismatches in axial alignment between said output shaft and said input shaft; and a frame, supporting said motor assembly, said frame connected such that vibrations from one of said motor or frame are attenuated relative to the other of said motor or frame, said frame including surfaces which vibrationally isolate said motor from said frame to attenuate noise from being transferred from the motor through the frame, said driven element including a rotational output surface, attached to said coupling element, such that upon rotation of said motor, said coupling element is caused to rotate which thereby causes rotation of said rotational output surface and said driven element, said coupling element noise-isolating said rotational output surface from said output shaft of said motor in addition to said compensation of mismatches of axial alignment, thereby substantially inhibiting noise energy from being transmitted from said motor to said rotational output surface.

2. The noise reducing drive system of claim 1, wherein said rotational output surface is a pulley which is attached by a belt to said driven element.

3. A system as in claim 1, wherein said anti noise coupling element comprises a cylindrical device with an isolation cut disposed about a middle portion and an annular recess formed in each end, said output shaft of said motor being disposed in one of said annular recesses, an other of said annular recesses formed to receive an output shaft.

4. A noise reducing drive system, comprising:

a motor assembly having an engagement surface against which a mounted object abuts, said motor assembly including an output shaft having an axis of rotation and extending from said engagement surface, said output shaft being capable of transmitting rotational motion from said motor assembly such that rotational energy from said motor assembly can be transmitted to an area spaced from said motor, said motor assembly rotating at a first rate;

a frame having a first surface and a second surface, said first surface substantially facing said engagement surface of said motor, said second surface of said frame being attached to said motor and having a rotation aperture having a diameter, said rotation aperture being formed substantially concentrically with said axis of rotation of said output shaft when said frame is attached to said motor, said frame including metal to metal contact preventing elements, which prevent metal to metal contact between said motor and said second surface of said frame, such that vibrations from said motor are not passed to said frame;

a bearing supported within said rotation aperture;

a pulley engagable with a drive belt and rotatably supported on said frame relative to said bearing, said pulley defining an area within which the drive belt will be movably retained such that upon rotation of said pulley, said drive belt will be caused to move in a circumferential direction, said pulley including a shaft via which said pulley is driven; and a flexible, vibration damping coupling element having drive shaft receiving surfaces and output shaft receiving surfaces, coupled between said motor and said shaft of said pulley, said coupling element having a property to inhibit the transmission of noise between said drive shaft receiving surfaces and said output shaft receiving surfaces and cause the combination to operate quietly, said flexible, vibration damping coupling element also compensating for mismatches in alignment between said output shaft of said motor assembly and said motor.

5. A noise reducing drive system in a stage lighting device, comprising:

a motor having an output shaft, said motor having an engagement surface;

a frame, attached to said engagement surface, formed with no metal-to-metal contact between said frame and said engagement surface;

an output drive shaft;

a flexible, vibration damping coupling element, coupled to said output shaft of said motor and said output drive shaft, for maintaining axial alignment between said drive shaft and said output drive shaft of said motor and which connects said output drive of said motor and said drive shaft, said coupling element being a flexible element adapted to inhibit transmission of vibration between said drive shaft of said motor and said output drive shaft, said flexible, vibration damping coupling element also compensating for mismatches in alignment between said drive shaft of said motor, and said output drive shaft.

6. The system as in claim 5 wherein said frame is formed with rubber grommets on said frame.

7. The system as in claim 5 wherein said frame includes a-first attachment surface, attached to said engagement surface by a first element which prevents metal-to-metal contact therebetween, and a frame assembly, attached to the engagement surface, and holding an element which maintains said axial alignment.

8. A method of reducing noise in a stage light which includes a color changer that is rotated to change the color that is projected by the stage light, comprising:

providing a motor in said stage light which is attached to rotate the color changer device that is in said stage light and thereby change a projected color;

attaching a frame to said motor via grommets which prevent metal to metal contact;

maintaining a coaxial alignment between a shaft of said motor and an output shaft for driving the color changer; and coupling said shaft of said motor and said output shaft with a flexible, vibration damping coupling device adapted to inhibit transmission of vibrational energy between shafts to thereby reduce transmission of noise from the motor to the color changer, said flexible, vibration damping coupling element also compensating for mismatches in alignment between the output shaft of said motor, and said output shaft for driving said color changer.

9. A noise reducing drive system, comprising:

a motor having an output shaft;

a pulley having a drive shaft;

an anti-noise coupling element, coupled between said drive shaft and said output shaft; and a frame, supporting said motor and said pulley, said frame having at least two apertures for holding the drive shaft and the output shaft in concentric aligned relationship once coupled by the anti-noise coupling element.

10. A method of minimizing noise in a motorized lighting assembly, comprising:

operating a motor at a high speed to produce noise and to produce output power at a lower speed on a output shaft;

coupling said output shaft to a second, low speed element, while isolating noise from said motor from said output shaft, using a flexible, vibration damping coupling element also compensating for mismatches in alignment between said output shaft and said second low speed element; and operating said low speed element to drive a driven element of the stage lighting device in a way to minimize the noise it produces.

* * * * *